United States Patent [19]

Place

[11] 3,845,441
[45] Oct. 29, 1974

[54] WIDE TEMPERATURE RANGE ADJUSTABLE DISC THERMOSTAT
[75] Inventor: Donald E. Place, Mansfield, Ohio
[73] Assignee: Therm-O-Disc, Incorporated, Mansfield, Ohio
[22] Filed: Aug. 14, 1972
[21] Appl. No.: 280,269

[52] U.S. Cl. .................. 337/347, 337/89, 337/368, 337/375
[51] Int. Cl. .......................................... H01h 37/12
[58] Field of Search ............ 337/89, 347, 349, 374, 337/375, 368, 379, 389

[56] References Cited
UNITED STATES PATENTS
3,356,807  12/1967  Brown et al. ...................... 337/365
3,573,700  4/1971  Schmitt ............................. 337/368
3,602,863  8/1971  Place ................................ 337/349

Primary Examiner—J. D. Miller
Assistant Examiner—Fred E. Bell
Attorney, Agent, or Firm—McNenny, Farrington, Pearne & Gordon

[57] ABSTRACT

An adjustable bimetallic snap disc thermostat is disclosed which can be adjusted through substantial temperature ranges without materially changing the differential temperature. The thermostat illustrated is provided with a disc having a relatively flat central portion formed with a shallow curvature, a generally conical portion around the central portion, and a shallow bend section joining the central portion and conical portion.

14 Claims, 6 Drawing Figures

WIDE TEMPERATURE RANGE ADJUSTABLE DISC THERMOSTAT

BACKGROUND OF THE INVENTION

This invention relates generally to adjustable bimetallic snap disc thermostat and more particularly to such a thermostat in which the operating temperature can be adjusted through a wide range without significant change in the operating differential temperature.

PRIOR ART

The U.S. Letters Pat: to Schmitt, No. 3,573,700; to Place, No. 3,602,863; and to Bletz, No. 3,676,817, all assigned to the assignee of the present invention, each disclose a thermostat in which bimetallic snap discs are provided in combination with adjustable range springs. Adjustment of the range springs operates to adjust the operating temperature of the thermostat.

In each of these Letters Patent, the bimetallic snap disc is formed with a smoothly curved shallow dished shape which is the disc shape most commonly used in the various types of bimetallic snap disc thermostats. The Schmitt U.S. Pat. No. 3,573,700, describes the manner in which the operating temperature of such a disc is changed when the disc is loaded. It is pointed out in such patent that changes in the force of a uniformly applied load displaces the operating temperature of the disc without materially changing either the snap positions or the differential temperature of the disc. It is noted, however, that increased loading does tend to reduce the temperature differential of operation to some extent.

Many thermostats need not be adjusted through wide temperature ranges and, in such instances, the reduction in temperature differential with the disc loading does not present a problem. In other instances, where wide ranges of temperature adjustment are required, the reduction of differential temperature with loading does not present a problem if the thermostat is provided with a sufficiently wide differential temperature and if changes in the differential temperature can be tolerated. However, the reduction in differential temperature exhibited by a conventional smoothly curved disc can be a problem in instances where the thermostat must be adjusted through wide temperature ranges and wherein the differential temperature is small or wherein changes in the differential temperature cannot be tolerated.

SUMMARY OF THE INVENTION

In the illustrated embodiment, a thermostat is provided with a disc that does not have the smoothly curved dish shape of the prior art patents mentioned above. Instead, the disc is formed with a relatively flat central section having a very shallow curvature and a substantially conical section extending from the central portion to the periphery wherein the central section is joined to the conical section by a bend section. It has been discovered that in a thermostat combining a disc of this shape with an adjustable range spring, in a manner described in greater detail below, the thermostat can be adjusted through much wider ranges of temperature without significant change in the differential temperature of operation of the thermostat. Consequently, thermostats in accordance with this invention can be used without problems where wide ranges of temperature adjustment are required without significant changes in operating differential temperature. For example, a thermostat in accordance with this invention can be provided with a low temperature differential in the order of 4°F. and adjusted through a temperature range in the order of 85° without encountering difficulty.

DETAILED DESCRIPTION OF THE DRAWINGS

Figure 1:
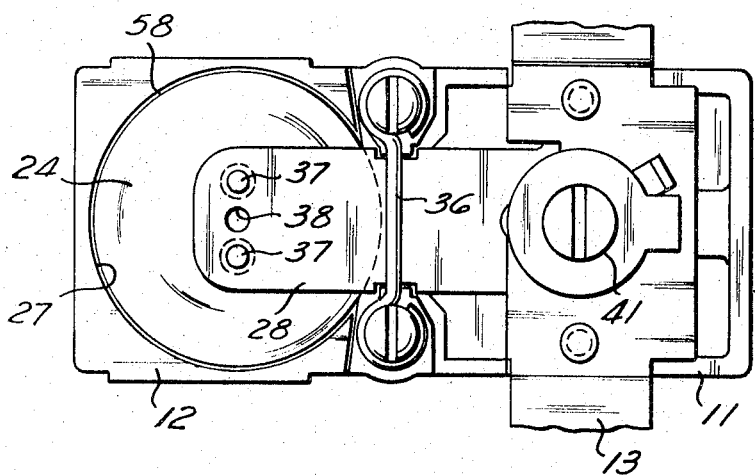
FIG. 1 is a plan view of an adjustable snap disc thermostat in accordance with this invention.
Figure 2:
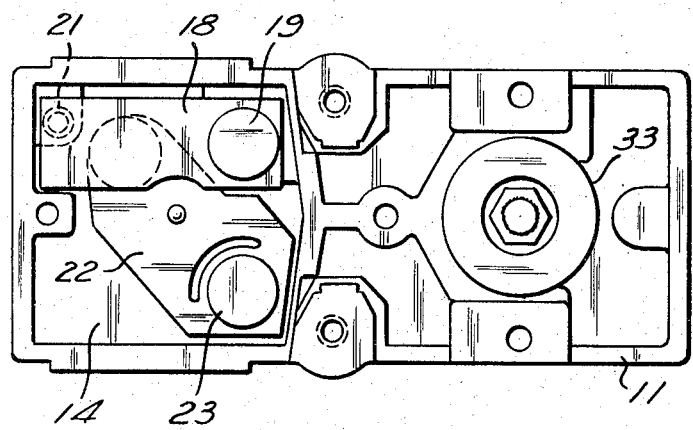
FIG. 2 is a plan view similar to FIG. 1 with parts of the thermostat removed to illustrate the switch mechanism.

The thermostat illustrated is very similar in structure and function to the thermostat illustrated in the Bletz patent, supra, and reference to such patent should be made for a clear understanding of the general function of the thermostat and the manner in which a single range spring is provided with two separate adjustments, one of which provides adjustment of the differential temperature and the other of which provides adjustment of the operating temperature. In the presently illustrated thermostat, however, the manner of mounting the snap disc differs from such patent and a separate adjusting screw is provided to compensate for tolerance variations in the assembled elements and to insure that the switch mechanism will open and close after the disc is in snap movement. Further, the illustrated thermostat differs from the thermostat disclosed in the Bletz patent in that the disc of the illustrated thermostat is not a conventional smoothly curved snap disc.

Referring to the drawings, the thermostat provides a body assembly 10 including a main body member 11, a cover member 12, and a mounting bracket 13. The main body member 11 and the cover member 12 are preferably molded of a non-conducting plastic material such as a phenolic resin and are shaped to provide an enclosed switch chamber 14. Mounted in the switch chamber 14 is a switch mechanism including a fixed contact 16 and a mobile or movable contact 17. The fixed contact 16 is mounted on a relatively stiff arm 18 mounted at one end on the body member 11 by a rivet 19. The free end of the arm 18 is engaged by a gauging screw 21 which is threaded into the body member 11 and permits adjustment of the position of the fixed contact 16 to compensate for variations in the dimensions of the various elements of the thermostat created by manufacturing tolerances.

The movable or mobile contact 17 is mounted on the free end of a cantilever mounted support arm 22 which is secured to the body member 11 at its other end by a rivet 23. The movable support arm 22 is formed of spring material and is proportioned to bias the movable contact 17 toward engagement with the fixed contact 16 as illustrated in FIG. 3.

A bimetallic snap disc 24 having a generally circular shape is supported at its periphery by the body assembly 10. Axial support of the periphery of the disc is provided by a wire ring 26 and radial location is provided by a cylindrical wall 27 formed in the cover member 12. The snap disc 24 is provided with a shape discussed in greater detail below so that adjustment of the range of the thermostat does not significantly alter the differential temperature of the thermostat. The center portion of the snap disc 24 is movable with snap action between two positions of stability when the disc temperature reaches predetermined temperatures determined by the adjustment of a range spring 28.

The movement of the center portion of the disc 24 is transmitted through an operator bumper 29 to the movable contact 17 so that the switch mechanism is opened and closed by the snap disc after the center portion of the snap disc is in snap movement. This insures that the full pressure between the contacts is maintained until the instant the contacts are opened and is re-established the instant the contacts close. The bumper 29 is guided for longitudinal movement by an opening 31 formed in the cover member 12 and is sized lengthwise to provide clearance or loss motion to insure that the disc is in snap movement before the switch is either opened or closed.

Figure 3:
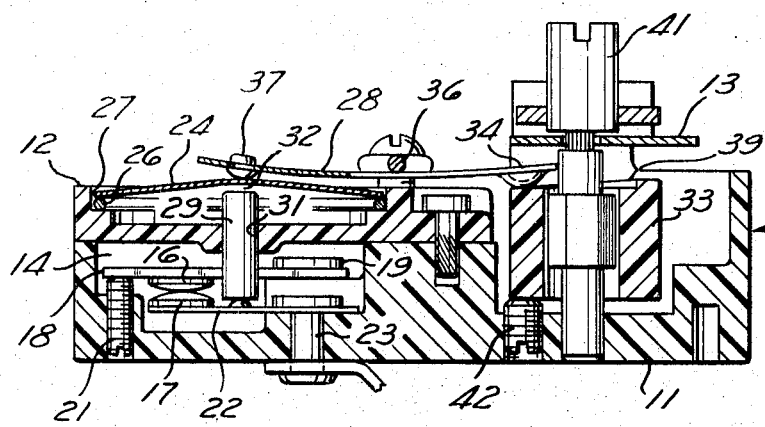
FIG. 3 is a longitudinal section of the thermostat illustrated in FIG. 1 with the plane of the section distorted to better illustrate the various functioning elements of the thermostat.

When the thermostat is positioned as illustrated in FIG. 3, the clearance 32 is located between the disc and the adjacent end of the bumper 29 because gravity maintains the other end against the mobile contact support 22. When the thermostat is inverted, the clearance exists at the switch end of the bumper since the gravity maintains the bumper against the disc.

The range spring 28 is an elongated spring which overlays the disc 24 at one end and engages a cam 33 at its other end 34. A fulcrum wire 36 engages the range spring at approximately a mid-position between the two ends thereof on the side of the range spring opposite the disc 24 and the cam 33. A pair of contact buttons or rivets 37 are mounted on the disc end of the range spring 28 and engage the disc 24 to transmit the spring force of the range spring to the disc. In the illustrated embodiment, two rivets 37 are provided which are symmetrically positioned on opposite sides of the center of the disc along a diameter of the disc perpendicular to the lengthwise direction of the range spring 28. Therefore, the spring force of the range spring 28 is, in the illustrated embodiment, applied to the center portion of the disc at two locations symmetrically positioned with respect to the geometric center of the disc. An opening 38 is formed in the range spring in alignment with the geometric center of the disc to permit access to the disc center during the assembly and calibration of the thermostat.

In the illustrated embodiment the thermostat is intended to provide a relatively narrow temperature differential in which the opening and closing temperatures are within about 5°F. of each other or less. Therefore, the range spring is selected to provide a positive spring rate having sufficiently high absolute value compared with the absolute value of the negative spring rate of the disc to reduce the differential temperature to such a relatively narrow differential temperature.

The fulcrum wire 36 is adjustable lengthwise of the range spring 28 to provide adjustment of the spring rate of the range spring at the disc end to provide an adjustment of the operating differential temperature of the thermostat. Such adjustment is made during manufacture of the thermostat and is normally not a user adjustment. This differential temperature adjustment is disclosed and claimed in the Bletz patent, supra.

The cam 33 is provided with a ramp 39 which is engaged by the cam end of the range spring 28 and is arranged so that rotation of the cam 32 by a stem assembly 41 causes lateral displacement of the cam end 34 of the range spring 28 to change the force of the range spring on the disc. Therefore, the position of the cam 33 through the action of the range spring determines the operating or calibration temperature of the thermostat. The axial position of the cam 33 with respect to the body assembly 10 is determined by a calibration screw 42. The manner in which the calibration or adjustment of the screw and the fulcrum wire can be separately accomplished is described and claimed in the Bletz patent, supra. This patent also discloses and claims the preferred arrangement in which the range spring is formed of bimetal so that the thermal forces of the bimetal of the disc 24 are augmented by the thermal forces of the bimetal range spring to increase the available thermal force for operating the switch per degree of temperature change sensed by the thermostat.

Figure 4:
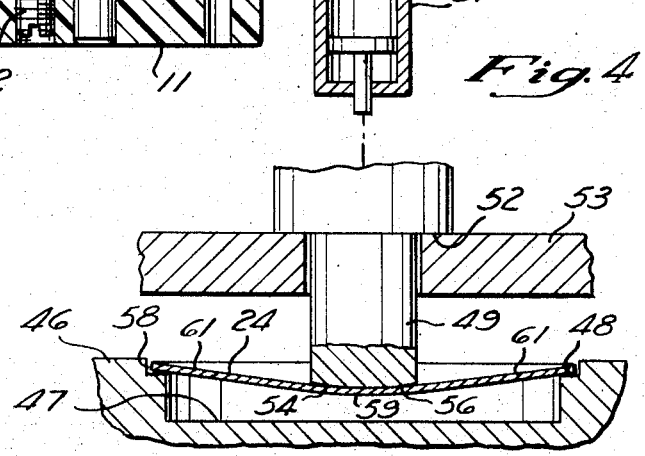
FIG. 4 is a schematic illustration of the tooling and method of forming the snap disc utilized in the illustrated thermostat in accordance with this invention.
Figure 5:
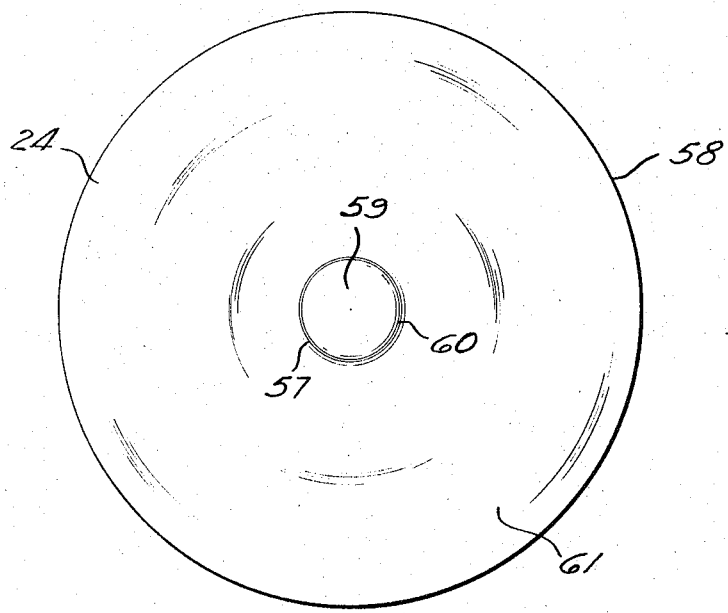
FIG. 5 is a plan view of a disc formed by the tooling illustrated in FIG. 4.
Figure 6:
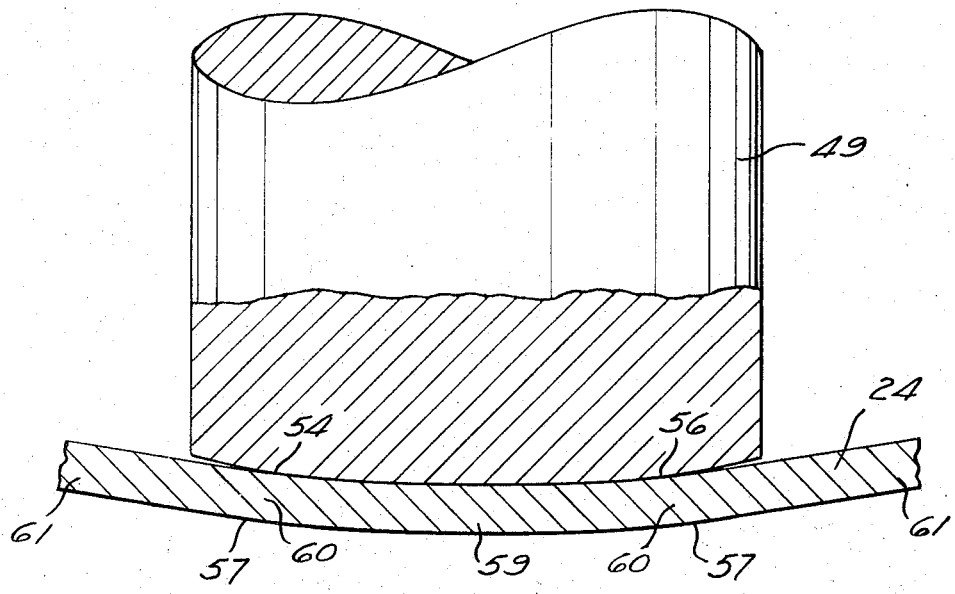
FIG. 6 is an enlarged fragmentary section illustrating with exaggeration the shape of the central portion of the disc.

FIG. 4 schematically illustrates the preferred tooling for forming the snap disc 24. This tooling includes a base 46 formed with a central recess 47 and a step 48 proportioned to receive the periphery of the blank used to form the disc 24. The step 48 provides both radial and axial positioning of the disc periphery and the recess 47 provides clearance with respect to the central portion of the disc.

The tooling also includes a punch 49 which is engagable with the center portion of the disc and which is operable to deform the blank to the shape illustrated. The punch is driven by suitable means such as a piston and cylinder actuator schematically illustrated at 51 and is provided with a shoulder 52 to engage an adjustable stop 53 which accurately gauges the stroke of the punch so that the disc is formed to the desired depth. The diameter of the disc-engaging end of the punch 49 is substantially less than the diameter of the disc and the disc is not engaged by the punch for a major portion of its radius. For example, the diameter of a punch used to form a 1 inch disc is preferably about one-quarter of an inch. In such a punch, the end is preferably formed with a curved surface having a relatively large radius of curvature in the order of one inch in the center zone between the location 54 and 56. Radially outward from the locations 54 and 56, the end of the punch is preferably formed with a radiused section having a smaller radius of curvature preferably in the order of three-quarters of an inch or less to prevent the occurrence of sharp bends in the disc.

The disc 24 formed by this tooling has a substantially conical section 61 extending from a location at 57 to the disc periphery at 58 and a center section 59 which is engaged directly by the punch 49. The center section 59 is relatively flat compared to the conical section 61 even though it may have a slight curvature due to the curvature formed on the end of the punch. The center section 59 is joined to the conical section 61 by a bend section 60 having a relatively smaller radius of curvature than the center section 59.

In most instances, it is the practice to complete the manufacture of the disc 24 by a second bumping or deforming operation from the opposite side in which the disc is pushed through the center in the opposite direction to equalize or relieve the stresses established during the initial deforming operation by the punch 49.

In the illustrated thermostat, the spacing of the two rivets 37 is such that the range spring force is applied substantially directly on the bend section 60.

The conventional disc provided in the designs of the patents cited above were formed with a punch having a larger diameter, usually at least equal to the disc diameter, provided with a spherical end. Such discs included a generally spherical central portion which joined to a generally conical portion without a bend section of reduced radius.

With a bimetallic disc shaped in the manner illustrated and used in combination with an adjustable range spring, it is possible to provide wide ranges of temperature adjustment without encountering problems caused by changes in differential temperature in operation. In one test of a thermostat of the type disclosed utilizing a conventional smoothly curved disc of the type illustrated in the prior patents cited above, a differential temperature of 5.3°F. was obtained when the thermostat was adjusted to an operating or calibration temperature of 113.8°F. Adjustment of the range spring to a calibration temperature of 81.8°F. caused a reduction in the differential temperature of the thermostat to 4°F. Further adjustment to a calibration temperature of 50°F. caused loss of differential temperature to the point where the snap action was lost and the contacts opened and closed with creep movement.

On the other hand, a test of the same type of thermostat in which a disc formed as illustrated and described above was substituted for a smoothly curved disc permitted far greater ranges of adjustment without loss of snap action. In one such test, a 4.3°F. differential temperature was obtained when the thermostat was adjusted to an operating or calibration temperature of 111.5°F. Adjustment of the range spring to a calibration temperature of 34.9°F. was possible without losing the snap action and a differential temperature of 3.7°F. was recorded.

In a similar test with another disc formed in the manner described above, a 4.1°F. differential temperature was recorded at a calibration temperature of 114.5°F. Adjustment of this thermostat to a calibration temperature of 30.5°F. was possible without losing snap action and a differential temperature of 3.8°F. was recorded. Consequently, a thermostat in accordance with this invention in the first instance was adjusted through a range of 76.6°F. and exhibited a change in the differential temperature of only 0.6°F. In the second instance, the thermostat was adjusted through a range of 84°F. and exhibited a change in differential temperature of only 0.3°F. These very low changes in differential temperature even over relatively wide ranges of range adjustment can be compared with a similar thermostat utilizing a conventional smoothly curved disc where an adjustment through a range of 32°F. created a loss of 1.3°F. in differential temperature, and an adjustment of range through 63.8°F. caused a complete loss of snap action.

It is believed that the loss of temperature differential which occurs when a conventional smoothly curved disc is adjusted through wide temperature ranges is caused by the fact that the distribution of the range spring force within the disc is not the same as the distribution of the thermal forces developed in the disc material when the temperature of the disc changes. It is further believed that the drastic reduction in change of differential temperature in the combination of this invention is accomplished because the distribution of the range spring forces within the disc material more closely approximates the distribution or pattern of the thermal forces produced when the temperature of the bimetal in the disc is changed.

In the illustrated disc, the bend section 60, even though it is very slight and is almost imperceptible even when the disc is sectioned, provides a zone of increased stiffness adjacent to the center of the disc. This circular zone of increased stiffness is believed to distribute the range spring force applied at the zone so that the pattern of the range spring force within the disc material more closely approximates the pattern of the thermal forces developed in the disc material so that the changes in differential temperature are negligible even under wide ranges of temperature adjustment. This very slight bend, however, does not produce sufficient stress concentrations to produce fatigue problems. Further, with the illustrated disc, the bend section provides a stiffness to resist the tendency of the localized application of the range spring force to cause a dimpling-like reverse curvature at the point of force application. Still further, the illustrated disc tends to have a higher negative spring rate value for a given disc height and this negative spring rate is maintained better as the disc is loaded by the range spring. The presence of such higher spring rate is probably due to the fact that the substantially conical section extends further toward the center than it does in the smoothly curved disc.

A thermostat in accordance with the present invention can be adjusted through much wider ranges with negligible changes in differential temperature of operation. Consequently, the thermostat in accordance with this invention eliminates the problem of substantial changes in differential temperature of operation where such changes cannot be tolerated and permits wide range adjustments of narrow differential temperature thermostats.

Although a preferred embodiment of this invention is illustrated, it is to be understood that various modifications and rearrangements of parts may be resorted to without departing from the scope of the invention disclosed and claimed herein.

What is claimed is:

1. An adjustable thermostat comprising a body assembly, switch means on said body assembly, a smoothly dished bimetallic snap disc mounted at its periphery on said body assembly the central portion of which moves with snap action between two positions of stability in response to changes in the temperature of said disc, said disc having a central zone which is relatively flat and a generally conical annular zone extending from said central zone to the periphery of said disc, said disc operating said switch means with snap action as said disc snaps between said positions, and adjustable spring means applying an adjustable spring force to said disc in all positions of said disc biasing said disc toward one of said positions, said spring means being operable to adjust the operating temperature of said disc through wide ranges of temperature without significantly changing the differential temperature of said thermostat.

2. An adjustable thermostat as set forth in claim 1 wherein said disc has a center, and distribution means are provided to distribute the force applied to said disc by said spring means around said center of said disc.

3. An adjustable thermostat as set forth in claim 2 wherein said spring means applies said spring force to said central zone of said disc at two locations spaced from said center of said disc.

4. An adjustable thermostat as set forth in claim 3 wherein said two locations are spaced diametrically on opposite sides of said center.

5. An adjustable thermostat as set forth in claim 4 wherein said distribution means includes a bend formed around said central zone of said disc.

6. An adjustable thermostat as set forth in claim 5 wherein said bend is circular and joins said central zone and said annular zone of said disc.

7. An adjustable thermostat as set forth in claim 6 wherein said central zone has a shallow dished shape with a first radius of curvature and said bend has a radius of curvature less than said first radius of curvature.

8. An adjustable thermostat as set forth in claim 1 wherein said central zone is joined to said conical zone by a shallow bend.

9. An adjustable thermostat as set forth in claim 8 wherein said spring means applies said spring force to said disc at at least two locations diametrically spaced on opposite sides of the center of said disc.

10. An adjustable thermostat comprising a body assembly, switch means on said body assembly, bimetallic snap disc mounted at its periphery in said body assembly the central portion of which moves with snap action between two positions of stability in response to changes in temperature, said snap disc being formed with stiffening means adjacent its center, said snap disc operating said switch means with snap action as said disc moves between said positions, an adjustable spring means applying an adjustable spring force to said disc adjacent to said stiffening means in all positions of said disc biasing said disc toward one of said positions, said spring means being operable to adjust the operating temperature of said disc through wide ranges of temperature without significantly changing the differential temperature of said thermostat.

11. An adjustable thermostat as set forth in claim 10 wherein said stiffening means includes a bent section formed in said disc with a radius of curvature less than the radius of curvature of the portions of the disc adjacent thereto.

12. An adjustable thermostat comprising a body assembly, switch means on said body assembly, a bimetallic snap disc mounted at its periphery in said body assembly the central portion of which moves with snap action between two positions of stability in response to changes in temperature, said snap disc operating said switch means with snap action as said disc snaps between said positions, an adjustable spring means applying an adjustable spring force to said disc in all positions of said disc biasing it toward one of said positions, said spring means and disc being provided with distribution means operating to distribute the forces of said disc resulting from said spring force in a pattern approximating the pattern of distribution of the thermal forces in said disc resulting from changes in disc temperature to a sufficient extent so that said spring means is operable to adjust the operating temperature of said disc through wide ranges of temperature without significantly changing the differential temperature of said thermostat.

13. An adjustable thermostat as set forth in claim 12 wherein said distribution means operates to distribute said spring force along a circular zone adjacent to the center of said disc.

14. An adjustable thermostat as set forth in claim 13 wherein said distribution means includes a bend section formed in said disc near the center thereof.

* * * * *